US006721006B1

(12) United States Patent
Hata

(10) Patent No.: US 6,721,006 B1
(45) Date of Patent: Apr. 13, 2004

(54) DIGITAL CAMERA AND CONTROL METHOD FOR THE SAME

(75) Inventor: Daisuke Hata, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/365,841

(22) Filed: Aug. 3, 1999

(30) Foreign Application Priority Data

Aug. 4, 1998 (JP) ............................................. 10-220553

(51) Int. Cl.[7] .................................................. H04N 3/14
(52) U.S. Cl. ....................................................... 348/294
(58) Field of Search ................................. 348/370, 371, 348/555, 558, 443, 454, 294, 312, 296

(56) References Cited

U.S. PATENT DOCUMENTS

| 4,222,074 A | * | 9/1980 | Breithaupt | .................. 358/149 |
|---|---|---|---|---|
| 4,489,348 A | * | 12/1984 | Lepley | .................. 358/149 |
| 5,184,091 A | * | 2/1993 | Srivastava | .................. 348/558 |
| 5,450,129 A | * | 9/1995 | Matoba et al. | .............. 348/294 |
| 5,835,157 A | * | 11/1998 | Miyazaki et al. | ........... 348/558 |
| 6,191,818 B1 | * | 2/2001 | Koizumi | ..................... 348/294 |
| 2002/0149679 A1 | * | 10/2002 | Deangelis et al. | ...... 348/207.99 |

FOREIGN PATENT DOCUMENTS

JP  5-75445  3/1993

* cited by examiner

Primary Examiner—Wendy R. Garber
Assistant Examiner—Rashawn N. Tillery
(74) Attorney, Agent, or Firm—Oblon, Spivak, McClelland, Maier & Neustadt, P.C.

(57) ABSTRACT

A CPU measures a cycle of a vertical synchronization signal inputted from an IPP based on an oscillation frequency of an internal ceramic oscillator. The CPU corrects the timing of starting the control of an object to be controlled based on the measured cycle of the vertical synchronization signal when the timing of starting the control of the object to be controlled is to be decided based on the vertical synchronization signal as a reference.

15 Claims, 4 Drawing Sheets

DIGITAL CAMERA AND CONTROL METHOD FOR THE SAME

FIELD OF THE INVENTION

The present invention relate to a digital camera and control method for the same, and more specifically to a digital camera capable of controlling each components thereof with a CPU and control method by the CPU.

BACKGROUND OF THE INVENTION

As a method of correcting the oscillation frequency of a CPU, for instance, there is a method disclosed in Japanese Patent Laid-Open Publication No. HEI 5-75445. As the oscillating element, quartz oscillators, ceramic oscillators, or CR oscillator are commonly used. A quartz oscillator is generally employed to generate the operating frequency of the IPP (Image Pre-Processor) which is a digital signal processing section in a digital camera and the precision of this quartz oscillator is fairly high. On the other hand, a ceramic oscillator is in most cases employed to generate the operating frequency of the CPU because the cost is low as well as a time required for starting oscillation is relatively short. When processing such as taking a picture is to be executed, the timing for each control in the CPU is in many cases set according to a vertical synchronization (vd) signal from the IPP as a starting point. When the timing is to be set in this way, the vertical synchronization signal (vd) is detected by means of interruption or the like, then a timer in the CPU is started at a time when the vertical synchronization signal (vd) is detected, and the processing under consideration is executed when a prespecified period of time passes after starting of the timer.

However, because an expensive quartz oscillator is used in the IPP error in the oscillation frequency is relatively small, on the other hand, because a low-cost ceramic oscillator is used in the CPU error in the oscillation frequency is larger and also the time precision is lower. Therefore, error is disadvantageously generated when the CPU is utilized to decide the timing for starting a control over an object to be controlled according to a vertical synchronization signal (vd) inputted from the IPP.

SUMMARY OF THE INVENTION

It is an object of the present invention to provide a digital camera and control method for the same which can prevent generation of error in the timing for starting the control when a CPU is utilized to decide the timing for starting the control of an object according to the inputted vertical synchronization signal.

The digital camera according to the present invention comprises a CPU which controls the operations of the internal components of the digital camera, the CPU having an oscillating element which generates an oscillation frequency; a vertical synchronization signal measuring unit for measuring a cycle of an inputted vertical synchronization signal based on the oscillation frequency generated by the oscillating element; and a correcting unit for correcting the timing of start of control over an object to be controlled based on the measured cycle of the vertical synchronization signal when the timing for start of controls over the object to be controlled is to be decided based on the vertical synchronization signal. When deciding the timing of starting the control of the object based on the vertical synchronization signal as a reference, the object can be controlled by a timing for starting which includes less error.

Other objects and features of this invention will become understood from the following description with reference to the accompanying drawings.

DESCRIPTION OF THE PREFERRED DRAWINGS

Detailed description is made for a preferable embodiment of a digital camera according to the present invention with reference to the attached drawings.

Figure 1:
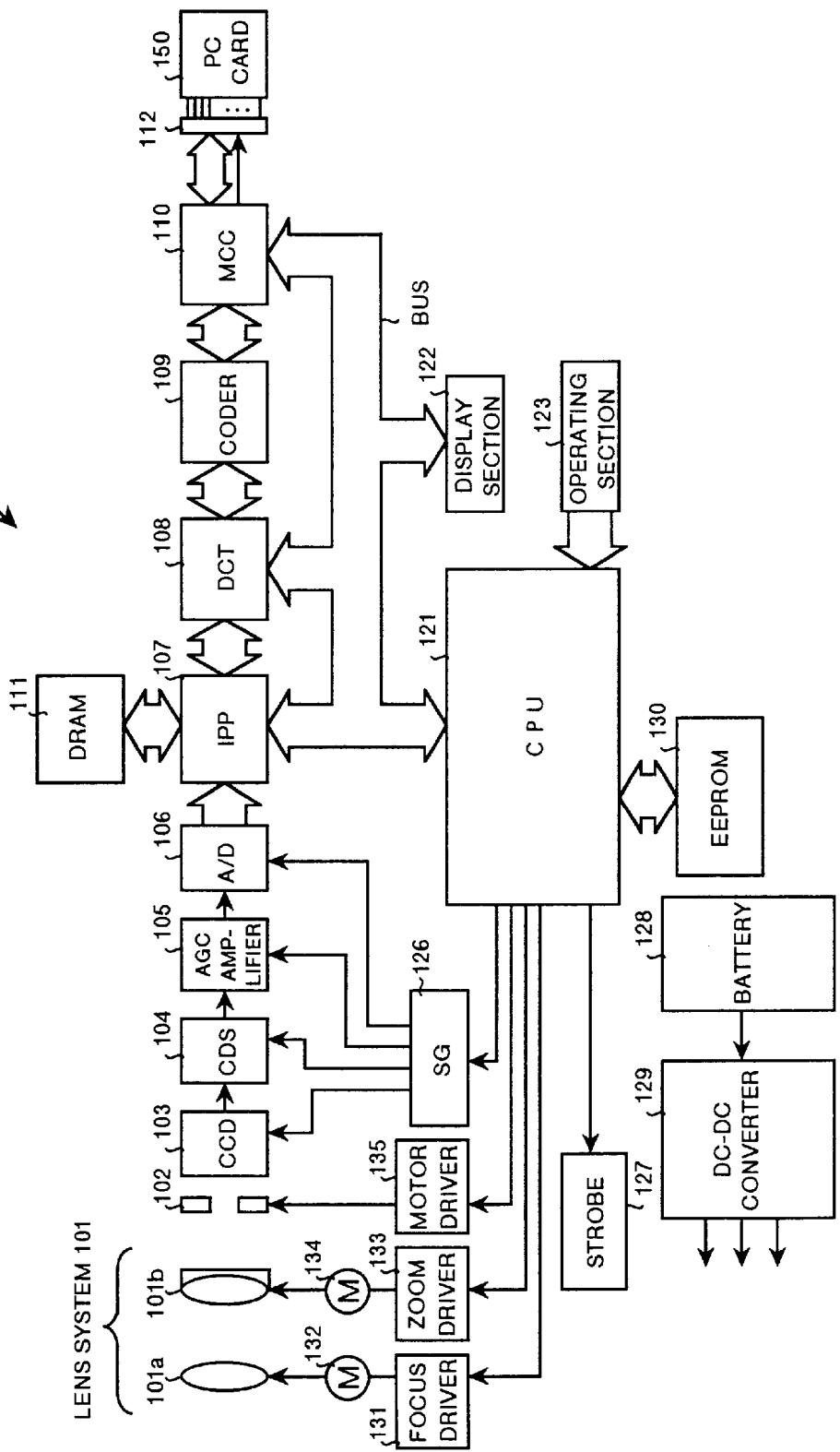
FIG. 1 is a view showing configuration of a digital camera according to an embodiment of the present invention.

FIG. 1 shows the configuration of the digital camera according to an embodiment of the present invention. In this figure, the reference numeral 100 indicates a digital camera. This digital camera 100 comprises a lens system 101, a mechanism 102 including components such as a focus and a filter, a CCD (Charge-Coupled Device) 103, a CDS (Correlation Double Sampling) circuit 104, a variable gain amplifier (AGC amplifier) 105, an A/D converter 106, an IPP (Image Pre-Processor) 107, a DCT (Discrete Cosine Transform) 108, a coder 109, a MCC (Memory Card Controller) 110, a DRAM 111, a PC (Personal Computer) card interface 112, a CPU (Central Processing Unit) 121, a display section 122, an operating section 123, a signal generating (SG) section 126, a strobe 127, a battery 128, a DC—DC converter 129, an EEPROM 130, a focus driver 131, a pulse motor 132, a zoom driver 133, a pulse motor 134, and a motor drive 135. A detachable PC card 150 can be connected via the PC card interface 112 to this digital camera 100.

A lens unit comprises the lens system 101 and the mechanism 102 containing components such as a focus and a filter. A mechanical shutter in the mechanism 102 simultaneously executes exposure to two fields. The lens system 101 comprises, for instance, a vari-focal lens, and includes a focus lens system 101a and a zoom lens system 101b.

The focus driver 131 can move the focus lens system 101a in a light-axis direction by driving the pulse motor 132 based on a control signal supplied from the CPU 121. The zoom driver 133 can move the zoom lens system 10b in the light-axis direction by driving the pulse motor 134 based on a control signal supplied from the CPU 121. The motor driver 135 drives the mechanism 102 according to a control signal supplied from the CPU 121 to a value set for instance for focusing.

The CCD 103 converts an image inputted via the lens unit to an electric signal (analog image data). The CDS circuit 104 is provided in order to reduce the noise from the signal outputted from the CCD type of image pick-up element.

The AGC amplifier 105 corrects a level of a signal having been subjected to correlation double sampling in the CDS circuit 104. A gain in the AGC amplifier 105 is set when set data (a control voltage) is set by a CPU 121 via a D/A converter incorporated in the CPU 121 in the AGC amplifier 105. Then the A/D converter 106 converts analog image data inputted by the CCD 103 via the AGC amplifier into a digital image data. In other words, the output signal from the CCD 103 is converted into a digital signal with an optimal sampling frequency (for instance, a frequency which is a few integer number times higher than a sub-carrier frequency of NTSC signal) in the A/D converter 106 after passing the signal via the CDS circuit 104 and AGC amplifier 105.

The IPP 107, the DCT 108, and the coder (Huffman encoder/decoder) 109 each constituting a digital signal processing section execute various types of data processing such as corrections, compression and expansion of image data for chrominance (Cb, Cr) and brightness (Y) with respect to the digital image data inputted from the A/D converter 106. The IPP 107 outputs timing signals such as a vertical synchronization signal (vd), a horizontal synchronization signal (Hd) or the like to the CPU 121. It should be noted that the IPP 107 uses an oscillation frequency of a quartz oscillator as an internal clock (operating frequency).

The MCC 110 once stores therein the compressed image data, and records the image data via the PC card interface 112 in the PC card 150 or reads the image data from the PC card 150.

The CPU 121 uses a RAM as a work area according to a program stored in a ROM, and controls all the operations of components of the digital camera 100 according to instructions from a operating section 123 or those from external devices such as a remote control unit not shown herein. More specifically, the CPU 121 provides controls over such operations as image pick-up operation, operation for causing the strobe to emit light, operation for automatic exposure, operation for automatically adjusting white balance (AWB), or auto-focusing operation. It should be noted that the CPU 121 uses an oscillation frequency of a ceramic oscillator as an internal clock (operating frequency).

The power is supplied from a battery 128 which may be a NiCd (nickel-cadmium) battery, a nickel-hydrogen battery, a lithium battery or the like to the DC—DC converter 129, and then the power is supplied into the other components of the digital camera 100.

The display section 122 is formed with LCD, LED, EL or the like, and this display section displays the picked up digital image data or recorded image data subjected to processing for expansion or the like. The operating section 123 has buttons for setting the parameters for various types of operation such as selection of a function, inputting an instruction for photographing, or the like from outside. Data for adjustment used when the CPU 121 controls operations of the digital camera is written in the EEPROM 130. The strobe 127 emits a strobe light according to a control signal outputted from the CPU 121.

The digital camera 100 (to be precise, the CPU 121) has three modes. First, a recording in which the camera can store the image data obtained by photographing an object into the PC card 150. Second, a display mode in which the camera can display the image data stored in the PC card 150. Third, a monitoring mode in which the camera can directly display the picked up image data on the display section 122.

Figure 2:
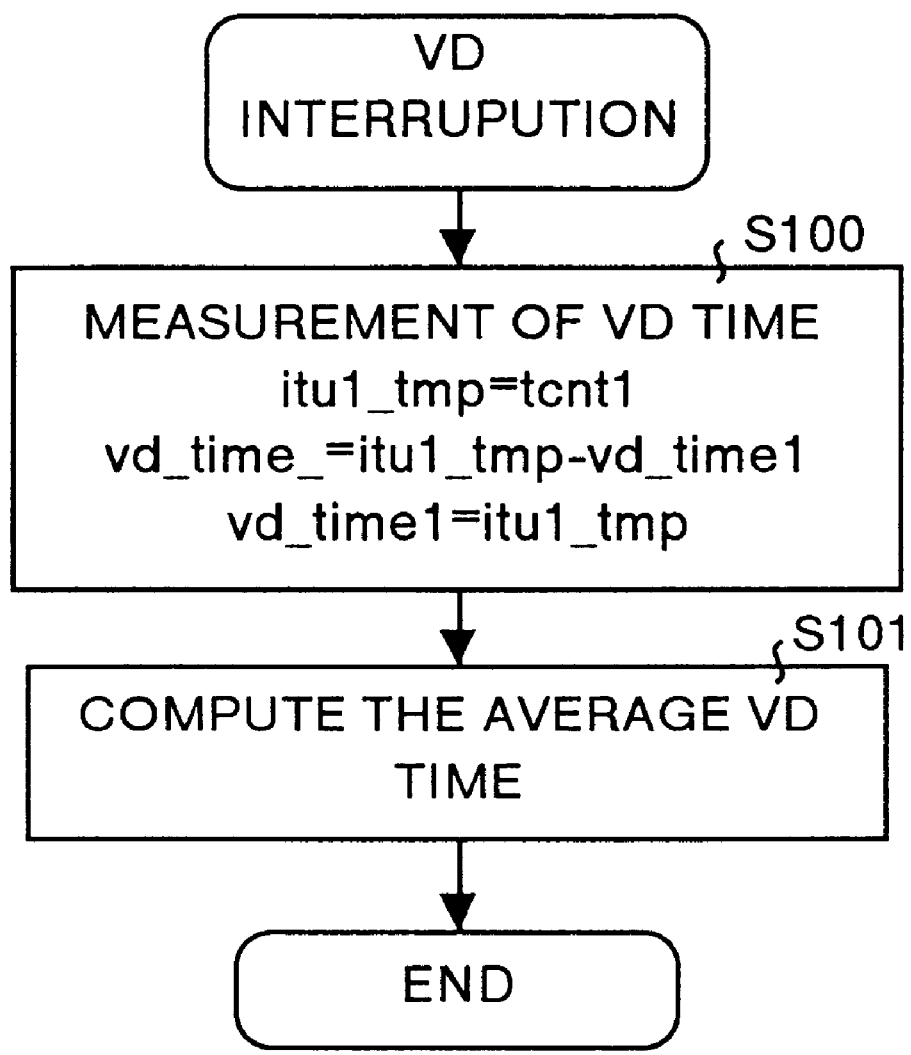
FIG. 2 is a flow chart which explains the processing for measuring a cycle of a vertical synchronization signal (vd) executed by a CPU.
Figure 3:
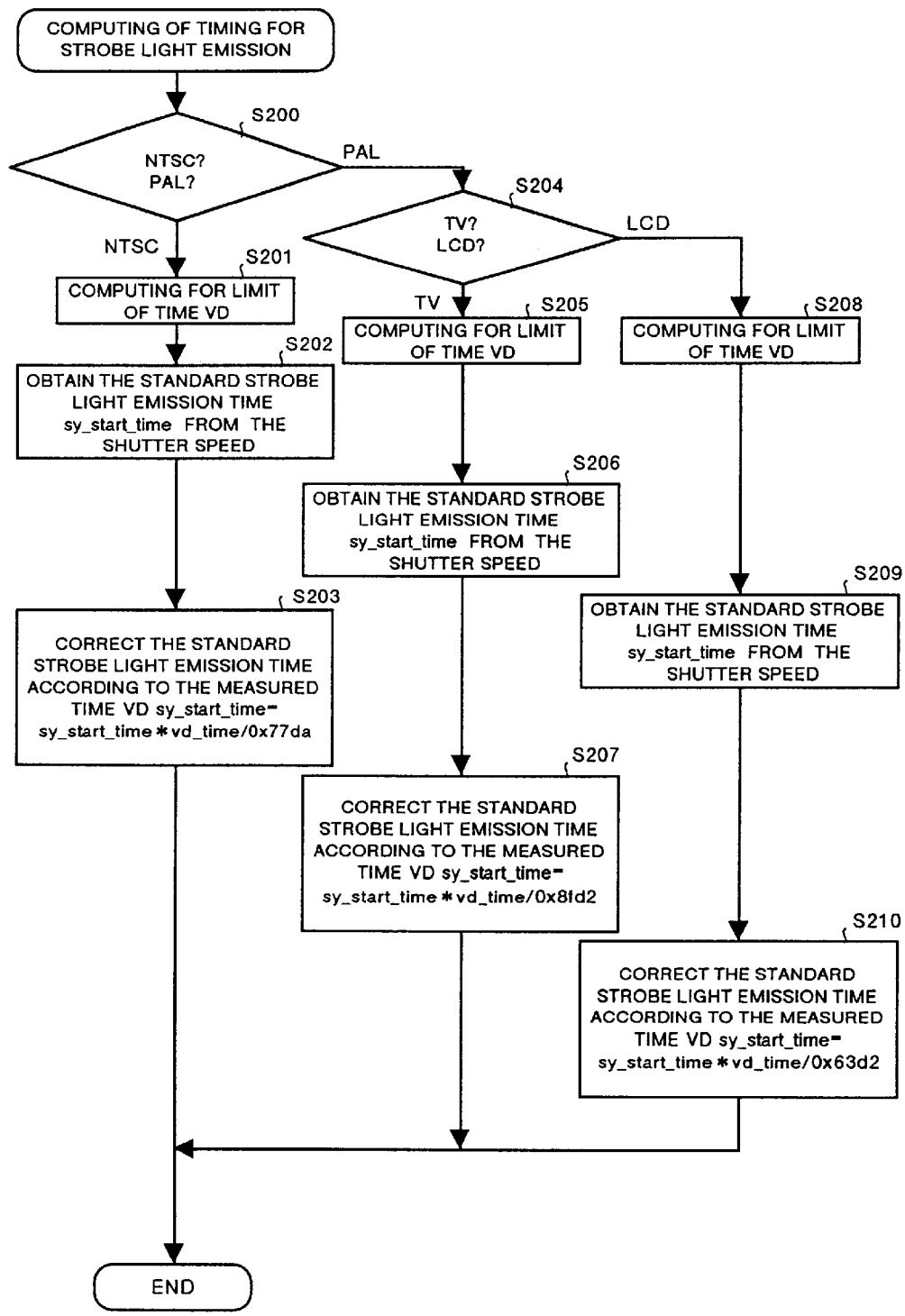
FIG. 3 is a flow chart which explains the processing for computing timing for light emission from a strobe executed by the CPU.

Operations of the CPU 121 when it decides a timing for starting of a control for an object to be controlled according to a vertical synchronization signal (vd) inputted from the IPP 107 is explained below by considering the timing control for light emission from a strobe as an example. FIG. 2 is a flow chart which explains the processing for measuring a cycle of a vertical synchronization signal (vd) executed by the CPU 121. FIG. 3 is a flow chart which explains the processing for computing timing for strobe light emission executed by the CPU 121.

Because an expensive quartz oscillator is used in the IPP 107 oscillation frequency error in the IPP 107 is small, however because a low-price ceramic oscillator is used in the CPU 121 oscillation frequency error in the CPU 121 is large and hence the time precision is also lower. Therefore, error is generated when the CPU 121 decides timing for starting control over an object to be controlled according to a vertical synchronization signal (vd) inputted from the IPP 107 as a reference. To overcome this problem, in this embodiment, the CPU 121 measures a cycle of this vertical synchronization signal inputted from the IPP 107 according to the internal operating frequency (an oscillation frequency of a ceramic oscillator) of the CPU 121, and corrects the timing of the strobe light emission according to this measured cycle of the vertical synchronization signal when the CPU 121 decides the timing of the strobe light emission according to the vertical synchronization signal (vd).

A processing for measuring the cycle of the vertical synchronization signal (vd) executed by the CPU 121 is explained with reference to FIG. 2. The parameters used in the figure have a meaning as follows.

tcnt1 : A count value by a (free-run) time in a CPU
vd_time : Cycle (time vd) of a vertical synchronization signal (vd) measured according to a timer in the CPU
vd_time1 : Parameter for storing a count value by the timer which measures the time vd.

In FIG. 2, when interruption is made by the IPP 107 to the CPU 121 according to vdHEAD (a frame vertical synchronization signal) or vd (a vertical synchronization signal), the CPU 121 measures the time vd (cycle of the vertical synchronization signal) using an internal timer according to an internal operating frequency (an oscillation frequency of a ceramic oscillator) (step S100). More specifically, measurement of a vd time is executed by computing through the equations:

$$itu1\_tmp=tcnt1,$$

$$vd\_time=itu1\_tmp-vd\_time1, \text{ and}$$

$$vd\_time1=itu1\_tmp.$$

Measurement of this time vd is executed several times. Then an average of the time vd obtained by executing the measurement several times is computed (step S101).

The processing for computing the timing of the strobe light emission executed by the CPU 121 is explained below. Table 1 indicates standard values by each count unit for vd_time with the timer above. Contents of this Table 1 are stored in a ROM in the form of data.

TABLE 1

| | time vd | 1.08642 µs is a time count value counted by a counter in the CPU |
|---|---|---|
| NTSC | 1/30 sec | 33.333 µs/1.08642 µs = 30.682 = 77D |
| PAL (TV) | 1/25 sec | 40.0 µs/1.08642 µs = 36.818 = 8FD2h |
| PAL (LCD) | 1/36 sec | 27.762 µs/1.08642 µs = 25.554 = 63D |

In FIG. 3, at first the CPU 1 determines whether the system is a NTSC system or a PAL and whether the display is a TV or a LVD (steps S200 and S204). More specifically, the vd_time measured is compared with the values in the Table 1 shown above to determine to which time vd the measured time is closer so as to determine whether the system is NTSC, PAL (TV) or PAL (LCD).

As a result of determination above (in steps S200, S204), when it is determined that the system is NTSC, then the CPU 121 computes a limit of the time vd (step S201). More specifically, assuming a range of error in oscillation precision of a ceramic oscillator as indicated by values in the Table. 1 (for instance, ±0.5%) as a limit for vd_time, vd_time is set to a value within this range.

Then, the CPU 121 computes a time from the time vd until strobe light emission, namely a standard time until timing for strobe light emission (sy_start_time) from the shutter speed (step S201). Then the CPU 121 corrects the standard strobe light emission time (sy_start_time) according to the measure time vd (vd_time) (step S203). More specifically, the CPU 121 obtains the corrected timing for strobe light emission based on the following equation sy_start_time (corrected timing for strobe light emission)

=sy_start_time*vd_time (time vd)/0x77da.

Herein 0x77da is the time vd measured by the CPU 121 when the oscillation precision of the ceramic oscillator is normal (for instance, ±0%). The standard time for strobe time emission is a value for a standard ceramic oscillator.

The CPU 121 sets sy_start_time in a timer to start the timer, and makes the strobe 127 emit light when counting down by the time is over.

On the other hand, when a result of determination (in steps S200, S204) indicates that the system is PAL (TV), then the CPU 121 computes a limit of the time vd (step S205). More specifically, assuming a range of error in oscillation precision of a ceramic oscillator as indicated by values in the Table 1 (for instance, ±0.5%) as a limit for vd_time, vd_time is set to a value within this range.

Then the CPU 121 computes a time from the time vd until strobe light emission, namely a standard time until timing for strobe light emission (sy_start_time) from the shutter speed (step S206). Then the CPU 121 corrects the standard strobe light emission time (sy_start_time) according to the measure time vd (vd_time) (step S207). More specifically, the CPU 121 obtains the corrected timing for strobe light emission based on the following equation sy_start_time (corrected timing for strobe light emission)

=sy_start_time*vd_time (time vd)/0x8fd2.

Herein the 8xfd2 is the time vd measured by the CPU 121 of PAL (TV) when the oscillation precision of the ceramic oscillator is normal (for instance, ±0%). Then the CPU 121 sets the sy_start_time in a timer to start the time, and makes the strobe 127 emit light when counting down by the timer is over.

When a result of determination (step S200, S204) indicates that the system is PAL (LCD), then the CPU 121 computes a limit of the time vd (step S208). More specifically, assuming a range of error in oscillation precision of a ceramic oscillator as indicated by values in the Table. 1 (for instance, ±0.5%) as a limit for vd_time, vd_time is set to a value within this range.

Then, the CPU 121 computes a time from the time vd until strobe light emission, namely a standard time until timing for strobe light emission (sy_start_time) from the shutter speed (step S209). Then the CPU 121 corrects the standard strobe light emission time (sy_start_time) according to the measure time vd (vd_time) (step S210). More specifically, the CPU 121 obtains the corrected timing for strobe light emission based on the following equation sy_start_time (corrected timing for strobe light emission)

=sy_start_time*vd_time (time vd)/0x63d2.

Herein the 0x63d2 is the time vd measured by the CPU 121 of PAL (LCD) when the oscillation precision of the ceramic oscillator is normal (for instance, ±0%). Then the CPU 121 sets the sy_start_time in a timer to start the time, and makes the strobe 127 emit light when counting down by the timer is over.

Figure 4A:
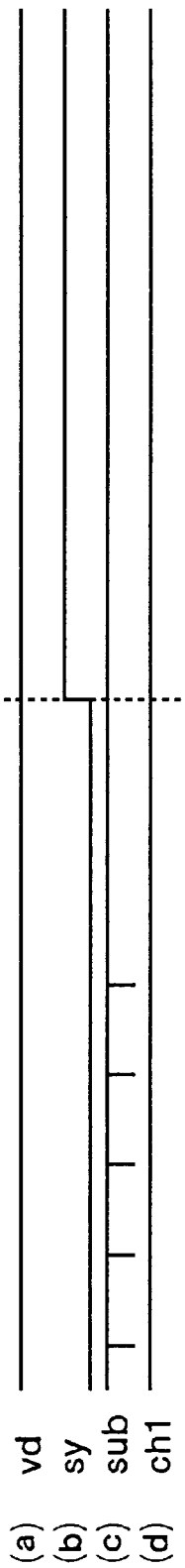
FIG. 4A and FIG. 4B are timing charts showing timing for light emission from the strobe.
Figure 4B:
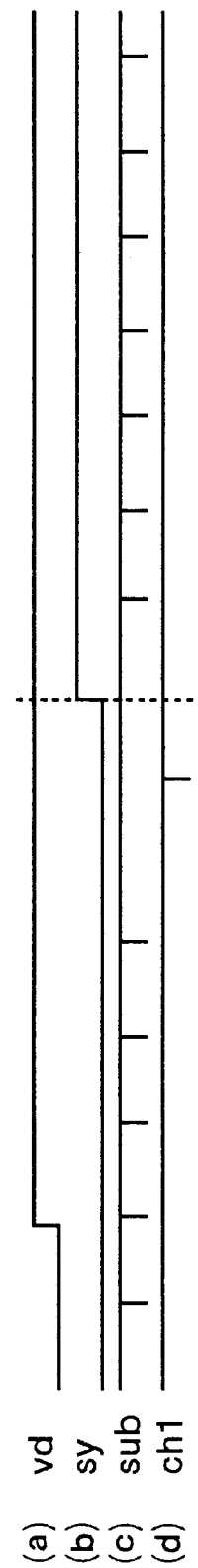

FIG. 4A and FIG. 4B are timing charts showing the timing of the strobe light emission. FIG. 4A shows the timing when the shutter speed is 1/250 sec, while FIG. 4B shows the timing when the shutter speed is 1/8000 sec. In these figures, (a) indicates vertical synchronization signal vd, (b) indicates the timing of the strobe light emission, (c) indicates reset (sub) of the accumulation of charge in the strobe 127, and (d) indicates image fetching (ch1).

As shown in the figure FIG. 4A, when the shutter speed is 1/250 sec, timing of the strobe light emission is excellent. On the other hand, as shown in the figure FIG. 4B, when the shutter speed is 1/8000 sec, the timing of the strobe light emission is not good. This is because, the strobe is in sub (charge accumulation reset) and the strobe light is emitted after ch1 (image fetching). When the shutter speed is high, the duration of time for which the light is emitted from the strobe may create a problem. It is desirable that the shutter speed is equal to the exposure time and emission of light from the strobe is finished within the time. Further, it is desirable to start the light emission from the strobe after sub output so long as possible, so that precision in timing of light emission should be higher than the shutter speed.

As described above, in this embodiment, the CPU 121 measures the cycle (time vd) of the vertical synchronization signal inputted from the IPP 107 based on the internal operating frequency, and corrects the timing of light emission from the strobe, when deciding the timing of strobe emission according to the vertical synchronization signal (vd) as a reference, according to the measured cycle (time vd) of the vertical synchronization signal. Therefore, even when a quartz oscillator is used for the IPP 107 and a ceramic oscillator is used for the CPU 121, generation of an error in timing of light emission from the strobe can be prevented and good timing of strobe light emission is insured even when the shutter speed is high. Namely in this embodiment, precision of an oscillator in the CPU 121 can be corrected with software.

Further, in this embodiment, a limit is provided for a cycle of the measured vertical synchronization signal (time vd), necessary measures can be taken even when the cycle (time vd) of the vertical synchronization signal is measured erroneously. Although it is described above that precision of the oscillation frequency of the ceramic oscillator used in the CPU 121 is low, the error is within around ±1%, so that the range for correction may be within around ±1%, and when the error is out of the range, the possibility of erroneous measurement of the cycle (time vd) of the vertical synchronization signal is rather high.

Further, in this embodiment, a cycle (time vd) of the vertical synchronization signal is measured several times, and an average of several values is sued as the measured value of the cycle (time vd) of the vertical synchronization signal, so that effects due to errors in the measurement can be reduced.

In this embodiment, at first determination is made as to whether a vertical synchronization signal inputted from the IPP 107 is based on the NTSC system or the PAL system, and then determination is made as to whether the measure cycle of the vertical synchronization signal is within a prespecified limit or not, so that the cycle (time vd) of the vertical synchronization signal can be detected accurately.

Although description of the embodiment above assumed a case where a quartz oscillator is employed in the IPP 107 and a ceramic oscillator is employed in the CPU 121. However, oscillators which can be used in the present invention is not limited to the ones described above. The present invention may be applied when the precision of the oscillator which generates the internal operating frequency in the signal receiving side is low. Further, the present invention can be used not only for correcting an error due to low precision of an oscillator, but also for a precision error due to environmental conditions such as a temperature or a voltage.

Further, description of the embodiment above assumes a case in which the vertical synchronization signal from the IPP 107 (vd) is used, however, the present invention can be applied not only to a vertical synchronization signal (vd), but also other types of signals like the operation frequency.

It should be noted that the present invention is not limited to the embodiment described above, and various types of modification and change can be made without changing gist of the present invention.

The digital camera according to the present invention comprises a CPU which controls the operations of the internal components of the digital camera, the CPU having an oscillating element which generates an oscillation frequency; a vertical synchronization signal measuring unit for measuring a cycle of an inputted vertical synchronization signal based on the oscillation frequency generated by the oscillating element; and a correcting unit for correcting the timing of start of control over an object to be controlled based on the measured cycle of the vertical synchronization signal when the timing for start of controls over the object to be controlled is to be decided based on the vertical synchronization signal. Therefore, when deciding the timing of starting the control of the object based on the vertical synchronization signal as a reference, the object can be controlled by a timing for starting which includes less error.

The digital camera according to the present invention has a limit for the measured cycle of the vertical synchronization signal, so that necessary measures can be taken even when the measured cycle of the vertical synchronization signal is erroneous.

With the digital camera according to the present invention, the vertical synchronization signal measuring unit measures the cycle of the vertical synchronization signal a plurality of times and an average of the measured values is used as the measured value for the cycle of the vertical synchronization signal, hence effects due to errors in the measurement can be reduced.

With the digital camera according to the present invention, the object to be controlled is a strobe light, hence good timing is insured for strobe light emission even when the shutter speed is high.

With the digital camera according to the present invention, the vertical synchronization signal measuring unit determines whether the vertical synchronization signal is based on the NTSC system or the PAL system and also determines whether the measured cycle of the vertical synchronization signal is within a limit or not, hence the cycle of the vertical synchronization signal can be measured accurately.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera comprising:
    a digital processing means having a first frequency error and for outputting a vertical synchronization signal; and
    a control means which controls the operations of the internal components of said digital camera, said control means having
    an oscillating means having a second frequency error greater than the first frequency error and for generating an oscillation frequency;
    a vertical synchronization signal measuring means for measuring a cycle of the inputted vertical synchronization signal based on the oscillation frequency generated by said oscillating means; and
    a correcting means for correcting a start time for controlling an object to be controlled based on the measured cycle of the vertical synchronization signal when the timing for start of controls over the object to be controlled is to be decided based on the vertical synchronization signal.

2. A digital camera according to claim 1; wherein a limit is provided for the measured cycle of the vertical synchronization signal.

3. A digital camera according to claim 1; wherein said vertical synchronization signal measuring means measures the cycle of the vertical synchronization signal a plurality of times and an average of the measured values is used as a measured value of the cycle of the vertical synchronization signal.

4. A digital camera according to claim 1; wherein the object to be controlled is a strobe light.

5. A digital camera according to claim 2; wherein said vertical synchronization signal measuring means determines whether the vertical synchronization signal is based on the NTSC system or the PAL system and also determines whether the measured cycle of the vertical synchronization signal is within the limit or not.

6. A digital camera comprising:
    a digital processing unit having a first frequency error and for outputting a vertical synchronization signal; and
    a control unit which controls the operations of the internal components of said digital camera, said control unit having
    an oscillating element having a second frequency error greater than the first frequency error and which generates an oscillation frequency;
    a vertical synchronization signal measuring unit which measures a cycle of the inputted vertical synchronization signal based on the oscillation frequency generated by said oscillating element; and
    a correcting unit which corrects a start time for controlling an object to be controlled based on the measured cycle of the vertical synchronization signal when the timing for start of controls over the object to be controlled is to be decided based on the vertical synchronization signal.

7. A digital camera according to claim 6; wherein a limit is provided for the measured cycle of the vertical synchronization signal.

8. A digital camera according to claim 6; wherein said vertical synchronization signal measuring unit measures the cycle of the vertical synchronization signal a plurality of times and an average of the measured values is used as a measured value of the cycle of the vertical synchronization signal.

9. A digital camera according to claim 6; wherein the object to be controlled is a strobe light.

10. A digital camera according to claim 7; wherein said vertical synchronization signal measuring unit determines whether the vertical synchronization signal is based on the NTSC system or the PAL system and also determines whether the measured cycle of the vertical synchronization signal is within the limit or not.

11. A control method for a digital camera, comprising the steps of:

outputting a vertical synchronization signal having a first frequency error;

generating an oscillation frequency having a second frequency error greater than the first frequency error;

measuring a cycle of the inputted vertical synchronization signal based on said oscillation frequency; and correcting a start time for controlling an object to be controlled based on said measured cycle of said vertical synchronization signal, when the timing for start of controls over the object to be controlled is to be decided based on said vertical synchronization signal.

12. A control method for digital camera according to claim 11; wherein a limit is provided for the measured cycle of the vertical synchronization signal.

13. A control method for digital camera according to claim 11; wherein said measuring step measures the cycle of the vertical synchronization signal a plurality of times and an average of the measured values is used as a measured value of the cycle of the vertical synchronization signal.

14. A control method for digital camera according to claim 11; wherein the object be controlled is a strobe light.

15. A control method for digital camera according to claim 12; wherein said measuring step determines whether the vertical synchronization signal is based on the NTSC system or the PAL system and also determines whether the measured cycle of the vertical synchronization signal is within the limit or not.

* * * * *